United States Patent
Vezzoli et al.

(10) Patent No.: US 11,369,995 B2
(45) Date of Patent: *Jun. 28, 2022

(54) METHOD FOR CONTROLLING A MOBILE DEVICE

(71) Applicant: HAP2U, Pontcharra (FR)

(72) Inventors: Eric Vezzoli, Grenoble (FR); Cédrick Chappaz, Pontcharra (FR)

(73) Assignee: Hap2U, Saint-Martin-d'Hères (FR)

( * ) Notice: Subject to any disclaimer, the term of this patent is extended or adjusted under 35 U.S.C. 154(b) by 94 days.

This patent is subject to a terminal disclaimer.

(21) Appl. No.: 16/617,601

(22) PCT Filed: May 25, 2018

(86) PCT No.: PCT/EP2018/063819
§ 371 (c)(1),
(2) Date: Nov. 27, 2019

(87) PCT Pub. No.: WO2018/219822
PCT Pub. Date: Dec. 6, 2018

(65) Prior Publication Data
US 2020/0179978 A1 Jun. 11, 2020

(30) Foreign Application Priority Data
May 29, 2017 (FR) ...................................... 1754696

(51) Int. Cl.
*G06F 3/039* (2013.01)
*G06F 3/041* (2006.01)
*B06B 1/06* (2006.01)

(52) U.S. Cl.
CPC .......... *B06B 1/0629* (2013.01); *G06F 3/0393* (2019.05); *G06F 3/0414* (2013.01)

(58) Field of Classification Search
CPC ... B06B 1/0629; G06F 3/0939; G06F 3/0414; G06F 3/043
(Continued)

(56) References Cited

U.S. PATENT DOCUMENTS

| | | | |
|---|---|---|---|
| 8,780,053 B2 | 7/2014 | Colgate et al. | |
| 8,995,228 B2 * | 3/2015 | Calvarese | G01S 5/22 367/127 |

(Continued)

FOREIGN PATENT DOCUMENTS

| | | |
|---|---|---|
| EP | 1956466 A1 | 8/2008 |
| EP | 2544077 A1 | 1/2013 |

(Continued)

OTHER PUBLICATIONS

European Communication pursuant to Article 94(3) EPC for European Application No. 18728832, dated Feb. 24, 2021, 14 pages with translation.

(Continued)

*Primary Examiner* — Albert K Wong
(74) *Attorney, Agent, or Firm* — TraskBritt (57) ABSTRACT

A method for controlling a mobile device—placed on a holder, comprising an interface plate configured to be touched by an object so as to control the device, and comprising at least two movement sensors configured to detect a movement of the device—comprises a) applying an object to the holder at a point of impact located outside the interface plate, the application of the object leading to a propagation of a vibration wave that propagates along the holder, toward the mobile device; b) detecting, with each movement sensor, the vibration wave at a detection time; c) comparing detection times detected by each movement sensor, respectively; d) estimating a position of the point of impact on the holder, depending on the comparison carried (Continued)

out in c); and e) generating a control signal of the mobile device depending on the position estimated in d).

13 Claims, 4 Drawing Sheets

(58) Field of Classification Search
USPC .......................................................... 310/334
See application file for complete search history.

(56) References Cited

U.S. PATENT DOCUMENTS

| | | | |
|---|---|---|---|
| 9,582,121 B2* | 2/2017 | Bang | G06F 3/043 |
| 9,857,920 B2* | 1/2018 | Chae | G06F 3/04883 |
| 2009/0243997 A1 | 10/2009 | Tierling et al. | |
| 2010/0085216 A1 | 4/2010 | Ms | |
| 2011/0084940 A1 | 4/2011 | Lee | |
| 2012/0191267 A1 | 7/2012 | Ogawa et al. | |
| 2013/0222230 A1 | 8/2013 | Choi et al. | |
| 2015/0242036 A1 | 8/2015 | Heidari et al. | |
| 2015/0309576 A1 | 10/2015 | Tissot | |
| 2015/0331966 A1 | 11/2015 | Harris et al. | |

FOREIGN PATENT DOCUMENTS

| | | |
|---|---|---|
| EP | 2707787 B1 | 12/2016 |
| FR | 3061567 A1 | 7/2018 |
| WO | 2014091089 A1 | 6/2014 |

OTHER PUBLICATIONS

Biet et al., Squeeze Film Effect for the Design of an Ultrasonic Tactile Plate, IEEE Transactions on Ultrasonics, Ferroelectrics and Frequency Control, IEEE, vol. 54, No. 12, Dec. 2007, pp. 2678-2688.

Vezzoli et al., Texture Rendering Strategies with a High Fidelity Capacitive Visual-Haptic Friction Control Device, International Conference on Human Haptic Sensing and Touch Enabled Computer Applications, pp. 251-260, London (UK), 2016.

International Search Report for International Application PCT/EP2018/063819, dated Aug. 7, 2018, 9 pages (including English translation).

International Written Opinion for International Application PCT/EP2018/063819, dated Aug. 7, 2018, 11 pages (including English translation).

\* cited by examiner

METHOD FOR CONTROLLING A MOBILE DEVICE

CROSS-REFERENCE TO RELATED APPLICATIONS

This application is a national phase entry under 35 U.S.C. § 371 of International Patent Application PCT/EP2018/063819, filed May 25, 2018, designating the United States of America and published in French as International Patent Publication WO 2018/219822 A1 on Dec. 6, 2018, which claims the benefit under Article 8 of the Patent Cooperation Treaty to French Patent Application Serial No. 1754696, filed May 29, 2017.

TECHNICAL FIELD

The disclosure relates to a method for locating a point of impact of an object, for example a finger or a stylus, on a holder, on which a mobile device, for example a tablet computer or a cell phone, is placed.

BACKGROUND

The success of touchscreens, in particular applied to mobile devices such as tablet computers or smartphones, has been accompanied by many developments. These screens generally comprise a plate, forming a transparent and smooth interface with which it is possible to control various parameters or software applications via contact with a finger. These screens are frequently coupled to a mesh made from a transparent conductive material, so as to detect the position of a point of contact on the plate via a capacitive effect. The mesh generally defines a matrix array, and the position of the point of contact of a finger is easily determined via a capacitive effect. Knowledge of the position of the finger on the interface plate allows a control signal, intended to control a functionality of the device, or intended to control, by wireless link, a remote receiver, for example a loudspeaker or a television, to be generated.

Recently, devices have been developed that allow a sensation of texture to be simulated when a finger of a user is applied to an interface plate. Such a device is, for example, described in the publication M. Biet, "Squeeze film effect for the design of an ultrasonic tactile plate," IEEE Transactions on Ultrasonic Ferroelectrics and Frequency Control, IEEE, 2007, 54 (12), pp. 2678-2688, referred to below as "Biet 2007," or even in patent application EP1956466. In these documents, a touch interface comprising a smooth interface plate intended to be touched by a finger is described. This plate is made to vibrate by a plurality of piezoelectric transducers, placed in contact with the plate, below the latter. The transducers and the plate form a resonator propitious to the formation of a stationary bending wave, of the Lamb-wave type. When the resonant frequency of vibration of the contact surface is in the ultrasonic domain, for example between 10 kHz and 100 kHz, and the amplitude of the vibration is small, typically a few microns, the user may sense the surface of the plate to have a texture when his finger slides along the surface. This effect is known and usually designated by the term "squeeze film." The user may thus perceive a sensation of roughness, or a certain resistance to the sliding movement, even though the contact surface is in fact a smooth.

This effect has been applied to transparent interface plates, suitable for forming screens. This is, in particular, the case of U.S. Pat. No. 8,780,053, or even patent EP2707787. In these documents, the piezoelectric transducers that make the plate vibrate are placed in proximity to the borders of a contact surface and allow the latter to be made to vibrate resonantly.

The interface plates described above may be coupled to a detection of a point of contact via capacitive effect. However, recourse to capacitive detection to detect a point of contact on an interface plate may not be appropriate in certain applications, for example, when the fingers of the user are not clean or when the user is not able to touch the interface plate with precision.

Devices for detecting a position of a point of impact about a device, such as a smart phone or touch tablet computer, have already been designed. Such devices are, for example, described in US2011084940, or in EP2544077 or even in US20150242036.

That which is described below targets a similar objective, by proposing a method making it possible to establish a control signal using a mobile device, having a touch interface plate, without requiring a contact between the interface plate and the finger of a user.

BRIEF SUMMARY

A first subject of the disclosure is a method for controlling a mobile device, the mobile device being placed on a holder, the mobile device comprising an interface plate able to be touched by an object so as to control the device, the mobile device comprising at least two movement sensors, which are able to detect a vibration propagating through the device, the method comprising the following steps:
  a) applying an object to the holder, at a point of impact, the point of impact being located outside the interface plate, the application of the object leading to a propagation of a vibration that propagates along the holder, toward the device;
  b) detecting, with each movement sensor, the vibration, at a detection time;
  c) comparing the detection times detected by each movement sensor, respectively;
  d) estimating a position of the point of impact, on the holder, depending on the comparison carried out in step c); and
  e) generating a control signal for the mobile device depending on the position estimated in step d).

The object may, in particular, be a finger or a stylus. The point of impact is preferably located on the holder, beyond the mobile device.

The mobile device is removably placed on the holder. It is preferably placed and removed without requiring the use of a tool.

The holder may be divided into elementary regions, and the position estimated in step d) is one of the elementary regions. The number and size of each elementary region depends on the number of movement sensors employed. The elementary regions may be preset depending on the number and position of each movement sensor.

The mobile device may comprise a touchscreen, formed, at least partially, by the interface plate, the latter being transparent.

According to one preferred embodiment, at least one movement sensor, and preferably each movement sensor, is a piezoelectric sensor, connected to the interface plate and able to detect a vibration of the latter. According to this embodiment, the interface plate may be connected to at least one so-called actuating transducer able to exert a pressure on the interface plate so as to form a stationary bending wave that propagates along the interface plate, at a resonant frequency, and that leads to a vibration of the interface plate. Such a configuration is particularly suitable for an implementation of the disclosed embodiments. It may give the interface plate advantageous functionalities, for example the perception of a sensation of a textured plate, or making it possible to estimate a force with which the object is pressed against the plate.

According to this embodiment, an actuating transducer may be used as movement sensor. According to this embodiment, at least one actuating transducer, or even each actuating transducer, is a piezoelectric transducer. According to one embodiment:

in step c), the comparison aims to determine a chronological order in which each movement sensor detects the vibration; the chronological order corresponds to the chronology of the detection times respectively associated with each sensor; and in step d), the point of impact is located depending on the chronological order resulting from step c).

Preferably, the distance between at least two movement sensors is larger than 2 cm, or even 5 cm.

The mobile device may comprise an emitting circuit, the method then comprising a step f) of emitting an emission signal, by wireless link, intended for a remote receiver, the emission being controlled by the control signal generated in step e).

The mobile device may, in particular, be a smart phone or a portable tablet computer. The mobile device is preferably removably placed on the holder.

According to one preferred embodiment, the interface plate extends in a plane, over an area, the holder extending over an area larger than two times, or even three times, or even five times, the area of the interface plate.

Another subject of the disclosure is a device, in particular a mobile device, comprising:

a microprocessor;

at least two movement sensors, which are able to detect a vibration propagating through the mobile device; and an interface plate, able to be touched by an object so as to control the mobile device, the device being characterized in that it is able to be placed on a holder and in that the microprocessor is configured to implement, following the application of an object to the holder at a point of impact, steps c) to e) of a method according to the first subject of the disclosure on the basis of detection signals generated by the movement sensors.

The device may comprise the features described above, with reference to the first subject of the disclosure, whether alone or in any technically producible combination. In particular, at least one movement sensor, and preferably each movement sensor, may be a piezoelectric sensor, connected to the interface plate and able to detect a vibration of the latter. The interface plate may then comprise at least one so-called actuating transducer, which is, in particular, piezoelectric, able to exert a pressure on the interface plate so as to form a stationary bending wave that propagates along the interface plate, at a resonant frequency, and that leads to a vibration of the interface plate.

Other advantages and features will become more clearly apparent from the following description of particular embodiments of the disclosure, which are given by way of nonlimiting example, and shown in the figures listed below.

BRIEF DESCRIPTION OF THE DRAWINGS

FIGS. 4A and 4B show one preferred embodiment of the disclosure.

DETAILED DESCRIPTION

Figure 1A:
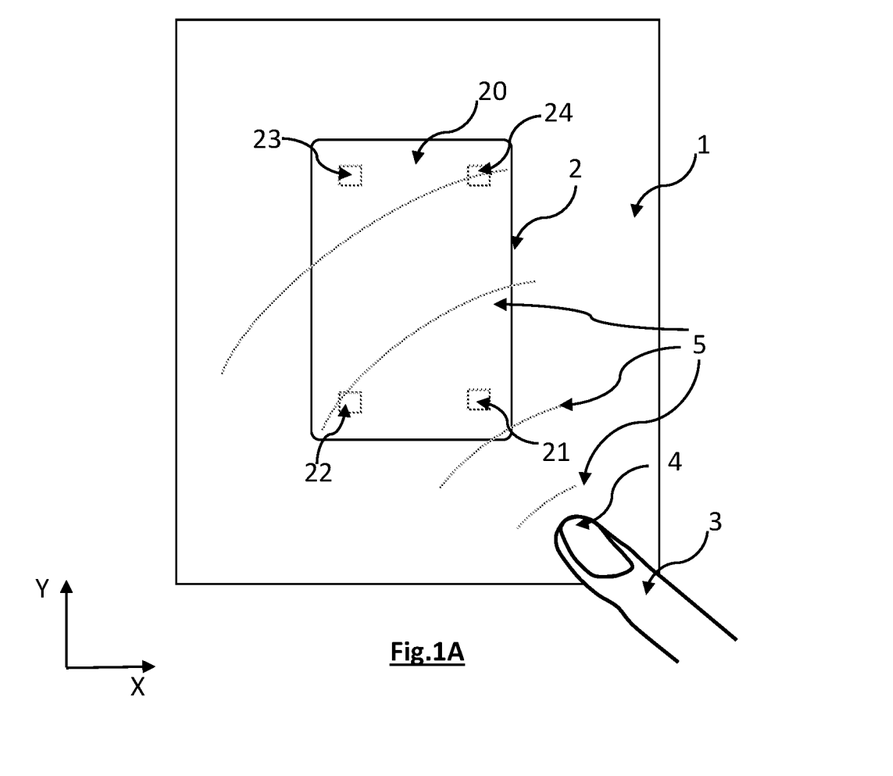
FIGS. 1A and 1B show an example of a mobile device, placed on a holder, for implementation of the embodiments of the disclosure.
Figure 1B:
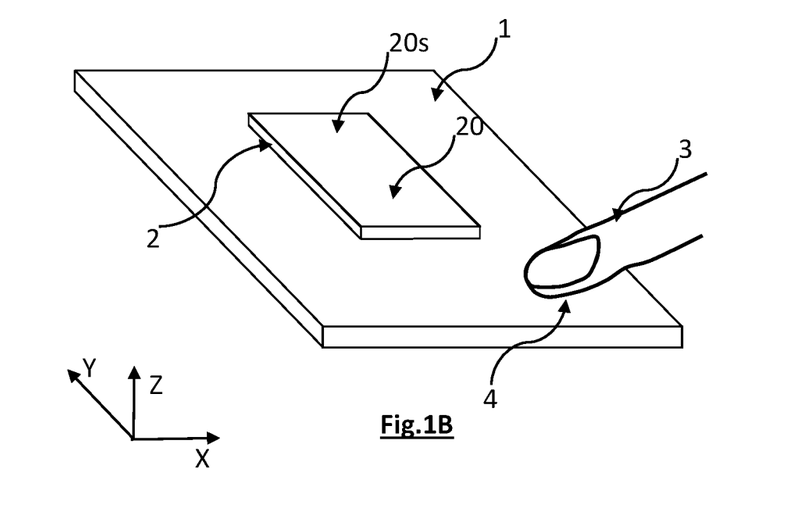

FIGS. 1A and 1B show an example of a device allowing embodiments of the disclosure to be implemented. A mobile device 2 is fastened to a holder 1. The term "mobile," when referring to a device, designates a compact and portable device able to be picked up by a user and reversibly placed on the holder 1. The mobile device comprises an interface plate 20, for example a glass plate or a plate of another transparent material, defining a touch interface, of touch-screen type. The interface plate 20 extends in a main plane XY and defines a contact surface 20s against which a finger, or another object, may press. The interface plate 20 may, for example, comprise means for detecting, via a capacitive effect, the point against which the finger is pressed, such as mentioned with reference to the prior art. The mobile device may be a smart cell phone (smart phone) or a tablet computer. It may also be a question of a touch screen with which a system intended to parameterize and/or control the system is equipped.

The mobile device is able to be controlled based on the position of the point at which the finger is pressed against the interface plate 20. This position may, for example, cause an application executed by a processor contained in the mobile device to launch. The position of the point pressed on the interface plate 20 may also allow an operating parameter of the device to be controlled.

The mobile device 2 comprises at least two movement sensors configured to detect a movement undergone by the interface. In the shown example, the mobile device comprises four movement sensors 21, 22, 23 and 24, which are connected to the interface plate 20. Preferably, at least two movement sensors, or even at least three or four movement sensors, are spaced apart from one another by a least 2 cm, and more preferably at least 5 cm. The movement sensors may be accelerometers, for example triaxial accelerometers, this type of accelerometer being common in mobile devices such as tablet computers or smartphones. According to one preferred embodiment, described below, the movement sensors are piezoelectric sensors coupled to the interface plate 20 and able to detect a vibration propagating along the latter.

Preferably, the holder 1 is made of a rigid material, for example a plastic, a glass or a metal. When an object 3 is applied against the holder 1, at a point of impact 4 located beyond the interface plate 20, the pressure exerted during the application leads to the formation of a vibration wave 5. The vibration wave 5 propagates along the holder 1. The rigid contact between the holder 1 and the mobile device 2 allows the vibration wave 5 to propagate through the mobile device. On propagating through the latter, the vibration is detected by the movement sensors, in such a way that, the closer a movement sensor is to the point of impact 4 the earlier the detection, by the sensor, of the vibration wave 5.

So as to make it easier to grasp the holder 1, and to implement the disclosed embodiments, the holder preferably extends over an area larger than or equal to three times, or even five times the area over which the interface plate 20 extends in the main plane XY. Preferably, the holder extends parallel to the main plane XY.

The object 3 applied against the holder, outside the interface plate 20, is pressed with a sufficient vigor to obtain a vibration wave detectable by the movement sensors. The inventors have demonstrated that current movement sensors, whether it be a question of accelerometers or piezoelectric sensors, are sufficiently sensitive to detect a vibration of amplitude as small as that produced by simply tapping on the holder 1 with a finger. The object 3 applied to the holder is generally a finger, but it may also be a stylus or another solid, and preferably rigid, body.

Figure 2A:
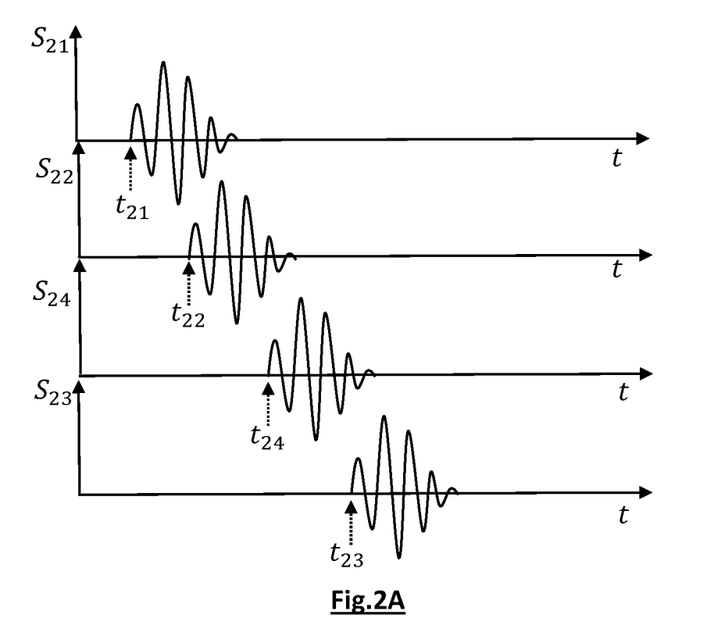
FIG. 2A schematically shows variations as a function of time in signals detected by movement sensors following the application of an object, for example a finger, to the holder.

FIG. 2A schematically shows distributions as a function of time of signals $S_{21}$, $S_{22}$, $S_{24}$, $S_{23}$, called detection signals, generated by the movement sensors 21, 22, 24, 23, respectively, when the point of impact 4 is located as illustrated in FIGS. 1A and 1B. To each sensor may be attributed a detection time t, corresponding to a time at which the sensor detects the vibration wave 5. The detection time then corresponds to the time at which the vibration wave 5 reaches the movement sensor. The detection time may easily be determined by thresholding the detection signal generated by each movement sensor, the thresholding being carried out using a preset threshold value or a threshold value depending on a noise of the sensor. It is conventional for the threshold to correspond to n times the standard deviation 6 of the noise of each sensor, n, for example, being equal to 2 or 3. The closer a sensor is to the point of impact, the earlier the detection time. FIG. 2A shows the respective detection times $t_{21}$, $t_{22}$, $t_{24}$, $t_{23}$ of each movement sensor 21, 22, 24 and 23.

The chronology of the detection times allows a position of the point of impact 4 on the holder 1 to be located. By "position," what is meant is an elementary region of the holder, of preset shape, in which the impact occurs. The higher the number of sensors, the smaller the size of each elementary region, and the higher the number of elementary regions may be, this allowing a higher number of positions to be defined.

Generally, the method allows a number of positions of the impact equal to $2^{N-1}$ to be distinguished, N being the number of movement sensors employed.

In the shown example, four movement sensors have been provided, respectively positioned at each corner of the mobile device 2 so as to maximize the distances between each movement sensor. This allows eight possible different positions of the point of impact 4 to be distinguished, in the polygonal elementary regions 11, 11', 12, 12', 13, 13', 14 and 14' delineated by dashed lines in FIG. 2B. Table 1 shows the correspondence between the chronology of the detection times and the elementary region in which the point of impact is located. The first column gives the reference of each elementary region shown in FIG. 2B. The other columns contain the chronological order, comprised between 1 (first detected time) and 4 (last detected time), of each detection time.

TABLE 1

Figure 2B:
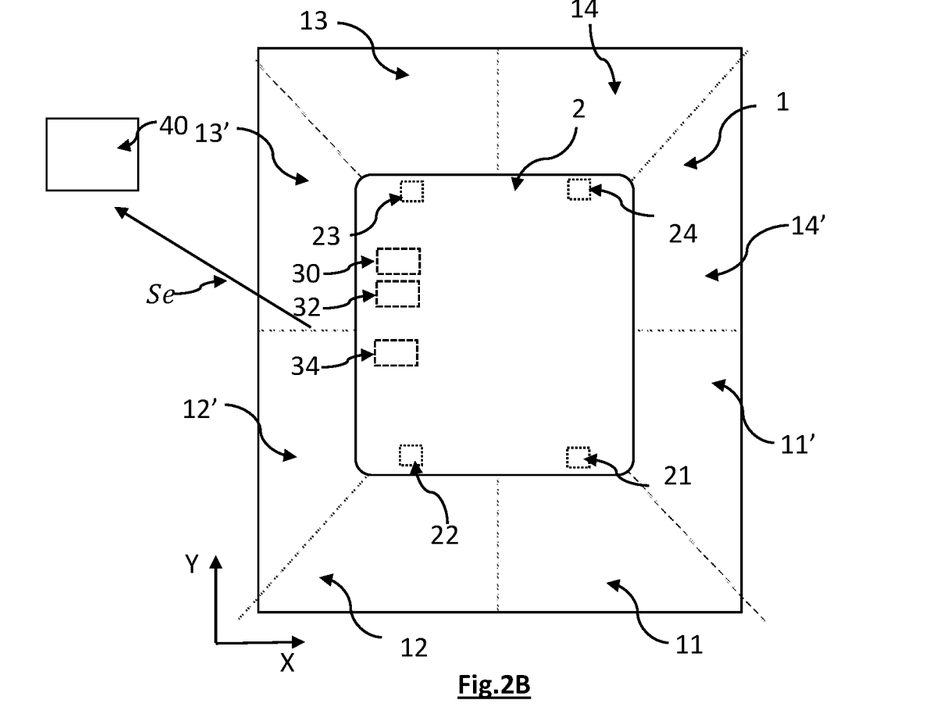
FIG. 2B shows various elementary regions, defined on the holder, corresponding to potential positions of a point of impact on the holder.

|  | $t_{21}$ | $t_{22}$ | $t_{23}$ | $t_{24}$ |
|---|---|---|---|---|
| 11 | 1 | 2 | 4 | 3 |
| 11' | 1 | 3 | 4 | 2 |
| 12 | 2 | 1 | 3 | 4 |
| 12' | 3 | 1 | 2 | 4 |
| 13 | 4 | 3 | 1 | 2 |
| 13' | 4 | 2 | 1 | 3 |
| 14 | 3 | 4 | 2 | 1 |
| 14' | 2 | 4 | 3 | 1 |

The mobile device 2 comprises a microprocessor 30, able to execute instructions stored in a memory 32, so as to locate the position 3 (FIG. 1B) of the point of impact 4 depending on the detection times, and to generate a control signal Sc based on this position. The control signal Sc may be intended for the mobile device; it is, for example, a question of an on/off instruction or the adjustment of an operating parameter. When the mobile device 2 is a telephone, the control signal Sc may, for example, be an instruction to answer a call, to hang up, or to modify the audio volume. Alternatively, the control signal Sc may be transmitted to an emitting circuit 34 of the mobile device, the emitting circuit then emitting an emission signal Se intended for a remote receiver 40 controlled by the mobile device. The location of the point of impact 4 thus allows the remote receiver 40 to be controlled. The remote receiver may, for example, be a television, the mobile device allowing the television to be controlled depending on the position of the point of impact 4.

Thus, the disclosed embodiments allow a control signal Sc to be generated, with the mobile device 2, without there being any need to touch the interface plate 20 or the mobile device 2 itself. It is a question of a particular way of using the mobile device 2, which is suitable for situations in which a contact with the interface plate 20 is not desirable, for example when the user has dirty fingers or when he is not able to act on this interface plate 20 precisely. The user may, for example, drive a vehicle, or perform another activity, while being able to control the mobile device 2 simply, without necessarily looking at the interface plate 20.

Figure 3A:
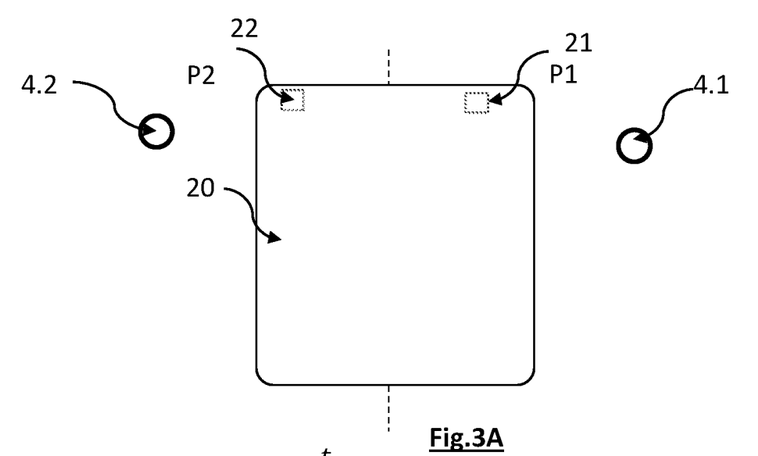
FIG. 3A schematically shows a used experimental device.
Figure 3B:
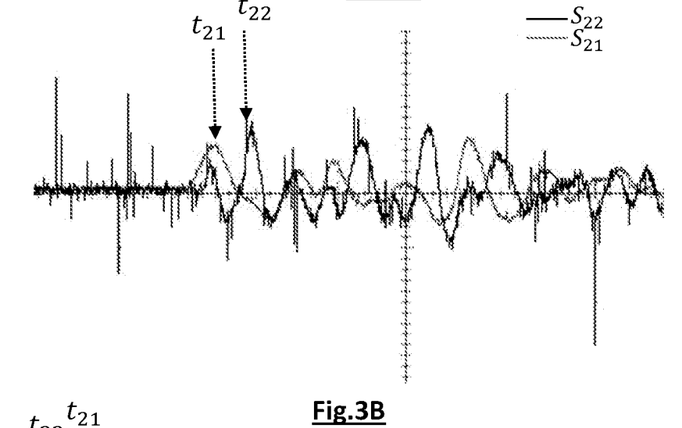
FIGS. 3B and 3C are curves illustrating variations as a function of time in signals recorded by movement sensors of the experimental device.
Figure 3C:
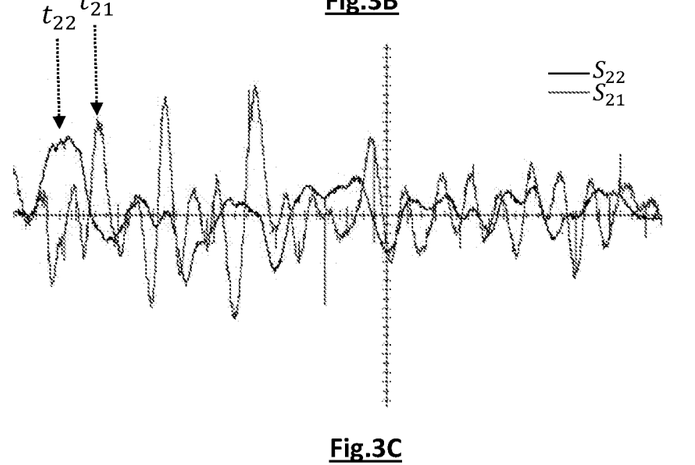

FIG. 3A shows an experimental trial, carried out using two piezoelectric sensors 21, 22 coupled to an interface plate 20 made of glass of 1.2 mm thickness placed on a table, which played the role of holder. The piezoelectric sensors 21, 22 were placed at a distance of about 10 cm from each other. Each sensor consisted of a thin layer of a piezoelectric material (PZT, acronym of lead zirconate titanate) of 500 µm thickness, placed between two thin conductive biasing layers (Ni—Au) of 100 µm thickness. Each sensor was of 10 mm×5 mm size in the plane XY. The holder was tapped with a finger, on either side of the sensors 21, 22. FIG. 3B shows the variation as a function of time in signals $S_{21}$ and $S_{22}$ recorded by the sensors 21 and 22, respectively, when the point of impact 4.1 was located closer to the sensor to 21 than to the sensor 22. FIG. 3C shows the variation as a function of time in signals $S_{21}$ and $S_{22}$ recorded by the sensors 21 and 22, respectively, when the point of impact 4.2 was located closer to the sensor 22 than to the sensor 21. In such a configuration, based on only two sensors, only two positions P1 and P2 are determinable, these positions corresponding to half-spaces on either side of the mobile device 2. In FIG. 3A, the positions are delineated by a dashed line.

When the disclosure employs piezoelectric movement sensors, the latter are formed from a piezoelectric material, for example AlN, LiNbO$_3$, BaTiO$_3$, placed between at least two electrodes. The electrodes may be formed from aluminum, nickel, gold or ITO (indium-tin oxide), platinum, etc. The piezoelectric sensors may be joined to the interface plate 20 by adhesive bonding. It may be a question of commercial sensors, for example of reference NOLIAC NCE41 or a MORGAN sensor of the series PZT400. The piezoelectric sensors may also be produced in thin-film form, by forming an integrating circuit obtained using microtechnology fabricating processes. Use of a thin-film fabrication technology facilitates the integration of the sensors into the interface plate. The piezoelectric transducers may be similar to those described in the publication E. Vezzoli, "Texture rendering strategies with a high fidelity capacitive visual-haptic friction control device," International Conference on Human Haptic Sensing and Touch Enabled Computer Applications, pp. 251-260, London, 2016.

Figure 4A:
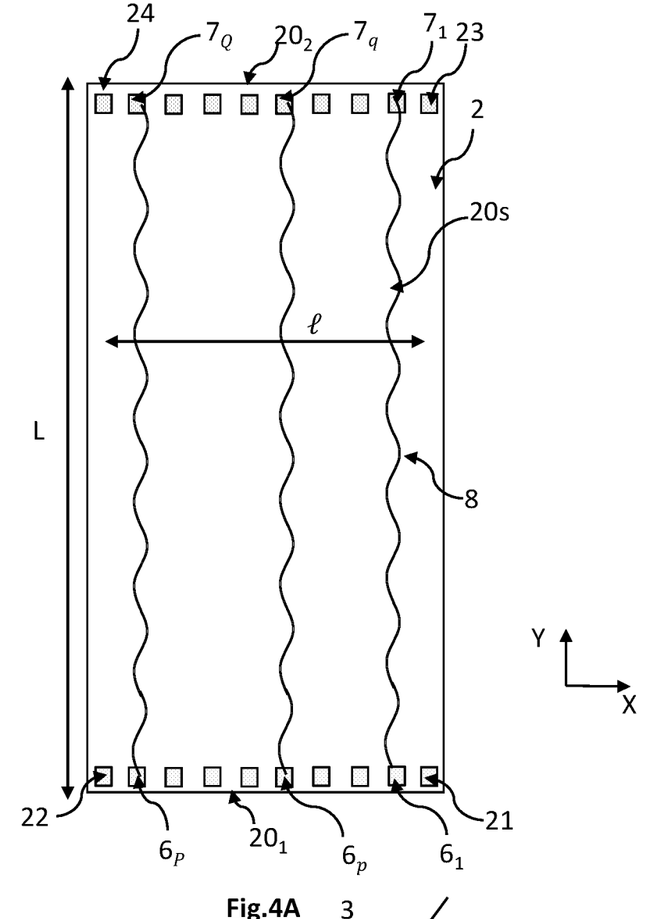
FIG. 4A shows a mobile device provided with a vibrating plate.
Figure 4B:
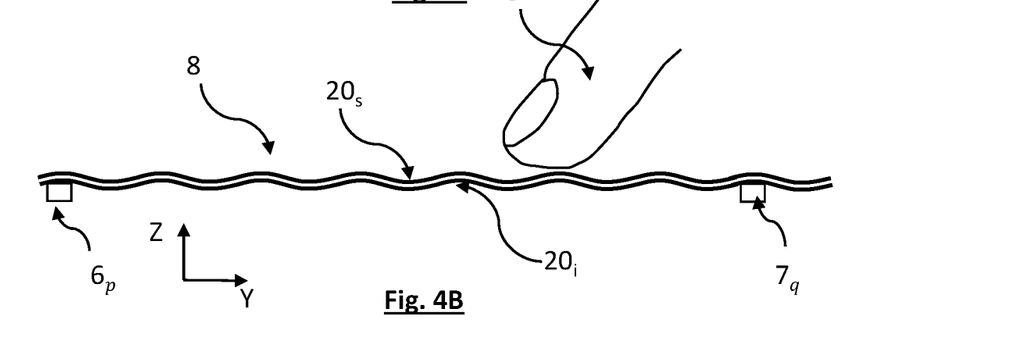
FIG. 4B illustrates the application of a finger to the vibrating plate.

FIGS. 4A and 4B show a mobile device 2 equipped with an interface plate 20 particularly suitable for implementing the disclosure. The interface plate 20 is transparent and extends in a main plane XY so as to form, in this plane, a rectangle of length L (along the axis Y) and of width l (along the axis X). In this example, L=195 mm, and l=125 mm. The thickness ε of the interface plate 20, along the transverse axis Z, is 1.5 mm. The thickness ε allows the interface plate 20 to vibrate with a stationary bending wave 8, as described below. The thickness ε depends on the material from which the interface plate is formed and on the targeted application, but it is preferably smaller than 10 mm, or even smaller than 5 mm. The material forming the interface plate 20 is, in this example, glass. Other, preferably rigid materials may be suitable, in particular materials the Young's modulus of which is comprised between 30 GPa and 100 GPa, and preferably between 30 GPa and 80 GPa. The material of the interface plate 20 may, for example, be a polycarbonate or another organic polymer, which will preferably be transparent.

The interface plate 20 is delineated by two lateral borders $20_1$ and $20_2$ in the vicinity of which are respectively aligned actuating transducers $6_1 \ldots 6_p \ldots 6_P$ and $7_1 \ldots 7_q \ldots 7_Q$. By "in the vicinity," what is meant is a distance smaller than 2 cm. In this example, P=Q=8. The actuating transducers are placed in contact with the interface plate 20 and allow the latter to be periodically deformed along an axis Z, perpendicular to the plane XY in which the interface plate 20 extends. The interface plate 20 is delineated by an upper surface, forming the contact surface $20_s$, and a lower surface $20_i$. In this example, the actuating transducers are applied against the lower surface $20_i$ of the interface plate 20.

The actuating transducers, by deforming, induce a movement of the interface plate 20 along the axis Z, i.e., in a direction perpendicular to the main plane XY. The transducers deform in oscillations. A stationary bending wave 8 is then generated, which propagates along the longitudinal axis Y. It is thus possible to obtain a formation of a stationary bending wave 8, extending along the longitudinal axis Y, at a resonant frequency of the transducers. An example of obtainment of such a stationary wave is, for example, described in section III of the publication "Biet 2007" cited with reference to the prior art, or in U.S. Pat. No. 8,780,053. In this example, the piezoelectric actuating transducers are activated synchronously, by a sinusoidal supply signal. The supply signals applied to all the transducers have, in this example, the same electrical amplitude, without phase shift from one transducer to the next. A person skilled in the art will be able to adapt the amplitude or the phase shift of the supply signal of each transducer, so as to obtain a stationary bending wave 8 that propagates along the interface plate 20, in a resonant mode. The resonant frequency of the stationary bending wave 8 is preferably higher than 10 kHz, and is preferably lower than 200 kHz. Such a frequency range is located in the ultrasonic domain, and causes no acoustic annoyance.

The resonant frequency may, for example, be 68 kHz. The wavelength λ of the following stationary bending wave 8 may be comprised between 3 mm and 40 mm. In this example, the wavelength λ is 16 mm. The amplitude of the bending wave is preferably lower than 10 μm, and is preferably lower than 5 μm or 3 μm. In this example, the stationary bending wave 8 is a Lamb wave of amplitude comprised between 2 μm and 3 μm. By "amplitude," what is meant is an amplitude in the direction Z perpendicular to the plane XY in which the interface plate 20 extends.

As mentioned with reference to the prior art, the formation of such a bending wave allows an object 3 (e.g., a finger) placed on the surface to experience a feeling that the contact surface $20s$ has a texture.

Moreover, recourse to a vibrating interface plate allows an applied force with which a finger is pressed against the interface plate 20 to be estimated, as described in patent application FR1750047 filed Jan. 3, 2017, published as FR3061567 on Jul. 6, 2018, and which is related to U.S. Patent Application Publication 2019/0354185, published Nov. 21, 2019. The estimation of the applied force may be obtained by measuring an attenuation of the amplitude of the stationary bending wave 8 propagating in the interface plate 20. It may also be obtained by imposing a so-called "set-point" amplitude on the stationary bending wave 8 and, following the application of a pressing force to the plate, by applying feedback so as to maintain the set-point amplitude. The intensity of the feedback then allows the applied force to be estimated. Such an estimation provides a new way of controlling the mobile device 2 equipped with the interface plate 20, the value of an operating parameter of the device being able to be controlled by a measurement of the pressing force applied by the finger or by any other object.

Such a configuration requires use of piezoelectric sensors connected to the interface plate 20. In the example shown in FIG. 4A, four piezoelectric sensors 21, 22, 23 and 24 have been placed in each corner of the interface plate 20. The piezoelectric sensors have a structure identical to the piezoelectric actuators $6_1 \ldots 6_P \ldots$ and $7_1 \ldots 7_Q$. Whereas a piezoelectric actuator generates a mechanical deformation from an electrical supply, a piezoelectric sensor generates an electrical signal from a mechanical deformation. In another example, the piezoelectric transducers $6_1 \ldots 6_P \ldots$ and $7_1 \ldots 7_Q$ play both the role of actuators and sensors. When they are used as actuators, they allow a sensation of texture on contact with the interface plate 20 to be obtained. When they are used as detectors, they allow a vibration of the interface plate 20 under the effect of an impact on the holder 1 to be detected. The signals that they detect are then transmitted to the microprocessor 30 in order to determine the position of the point of impact 4 on the holder 1, and to establish a control signal Sc depending on this position.

Thus, a method according to the disclosure may particularly be implemented in a mobile device equipped with an interface plate 20 that is able to be subjected to a stationary bending wave, because such a plate is necessarily coupled to piezoelectric transducers. The embodiments of the disclosure allow an additional functionality to be added to the capabilities made possible by a vibrating interface plate, such as a sensation of texture to the touch and/or an estimation of the strength of a pressing force exerted on the interface plate. The propagation of the stationary bending wave 8 may, however, disrupt the detection, by a movement sensor, of the vibration wave 5 generated by the impact of the object 3 (e.g., a finger) and affect the sensitivity of the detection. It is therefore preferable, but not necessary, for the method to be implemented without propagation of the stationary bending wave if it is desired to achieve a high detection sensitivity.

The invention claimed is:

1. A method for controlling a mobile device, the mobile device being placed on a holder, the mobile device comprising an interface plate configured to be touched by an object so as to control the mobile device, the mobile device comprising at least two movement sensors configured to detect a vibration propagating through the mobile device, the method comprising:
   a) applying the object to the holder at a point of impact, the point of impact being located outside the interface plate, the application of the object leading to a propagation of a vibration that propagates along the holder, toward the mobile device;
   b) detecting, with each movement sensor, of the at least two movement sensors, the vibration, at a detection time;
   c) comparing the detection time detected by each movement sensor, respectively;
   d) estimating a position of the point of impact, on the holder, depending on the comparison carried out in c); and
   e) generating a control signal for the mobile device depending on the position estimated in d);

wherein:
   the interface plate is connected to at least one actuating transducer configured to exert a pressure on the interface plate so as to form a bending wave that propagates along the interface plate, at a resonant frequency, and that leads to a vibration of the interface plate;
   at least one of the at least one actuating transducers forming one of the at least two movement sensors; and
   the resonant frequency is within the ultrasonic domain so that a sensation of texture is obtained when touching the interface plate; and wherein the method further comprises estimating a force applied on the interface plate when the interface plate is touched, the estimation of the force comprising:
   vibrating the interface plate, using the at least one actuating transducer, so that the bending wave propagates along the interface plate;
   imposing a set-point amplitude to the bending wave;
   following the application of the force to the interface plate, applying feedback to the at least one actuating transducer so as to maintain the set-point amplitude; and
   estimating the force based on the feedback.

2. The method according to claim 1, wherein at least one movement sensor, of the at least two movement sensors, is an accelerometer.

3. The method according to claim 1, wherein at least one movement sensor, of the at least two movement sensors, is a piezoelectric sensor connected to the interface plate and configured to detect a vibration of the interface plate.

4. The method according to claim 3, wherein each of the at least two movement sensors is a piezoelectric sensor.

5. The method according to claim 1, wherein:
   in c), the comparison determines a chronological order in which each movement sensor, of the at least two movement sensors, detects the vibration; and
   in d), the point of impact is located depending on the chronological order resulting from c).

6. The method according to claim 1, wherein a distance between the at least two movement sensors is larger than 5 cm.

7. The method according to claim 1, wherein:
   the mobile device comprises an emitting circuit; and
   the method further comprises:
   f) emitting an emission signal, by wireless link, intended for a remote receiver.

8. The method according to claim 1, wherein the mobile device is a smart phone or a portable tablet computer.

9. The method according to claim 1, wherein the mobile device is removably placed on the holder.

10. The method according to claim 1, wherein:
    the interface plate extends, in a plane, over an area; and
    the holder extends over an area larger than three times or five times the area of the interface plate.

11. A mobile device, comprising:
    a microprocessor;
    at least two movement sensors configured to detect a vibration propagating through the mobile device; and
    an interface plate configured to be touched by an object so as to control the mobile device, the interface plate being connected to at least one actuating transducer configured to exert a pressure on the interface plate so as to form a bending wave that propagates along the interface plate, at a resonant frequency, and that leads to a vibration of the interface plate;

wherein:
    the mobile device is configured to be placed on a holder;
    the microprocessor is configured to implement, following application of the object to the holder at a point of impact, steps c) to e) of a method according to claim 1 on the basis of detection signals generated by the at least two movement sensors, at least one of the at least two movement sensors being an actuating transducer;
    the resonant frequency lies within the ultrasonic domain; and
    the mobile device is configured to estimate a force applied on the interface plate, when the interface plate is touched, the estimation of the force comprising:
    vibrating the interface plate, using the at least one actuating transducer, so that the bending wave propagates along the interface plate;
    imposing a set-point amplitude to the bending wave;
    following the application of the force to the interface plate, applying feedback to the at least one actuating transducer so as to maintain the set-point amplitude; and
    estimating the force based on the feedback.

12. The mobile device according to claim 11, wherein at least one movement sensor, of the at least two movement sensors, is a piezoelectric sensor, connected to the interface plate and configured to detect a vibration of the interface plate.

13. The method according to claim 1, wherein the resonant frequency lies between 10 kHz and 200 kHz.

* * * * *